R. D. SMITH.
HUMIDIFIER.
APPLICATION FILED JULY 24, 1918.
1,305,943.
Patented June 3, 1919.
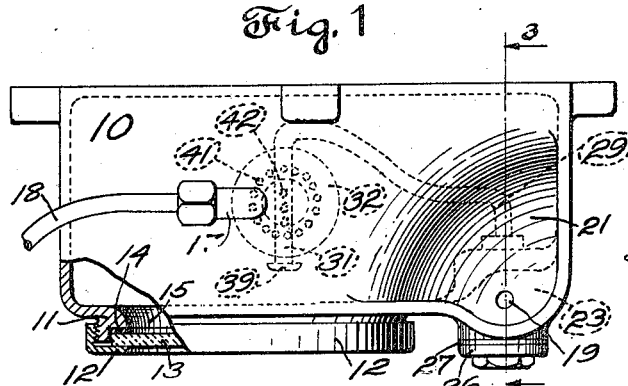
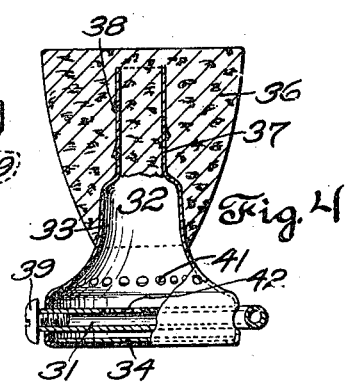
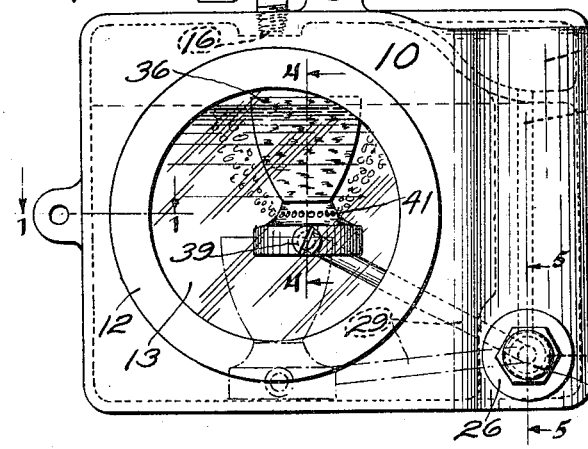
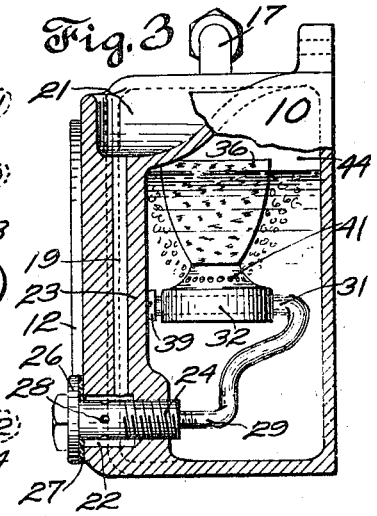
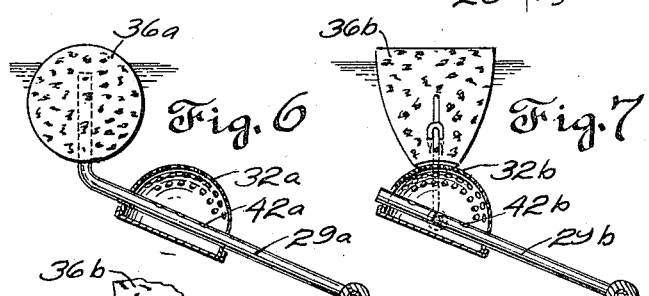
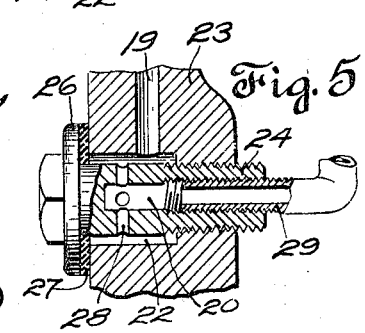
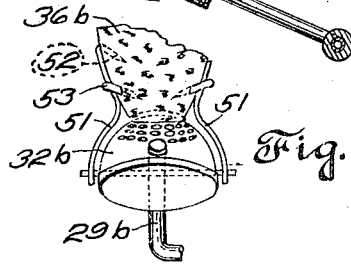
Inventor,
Raymond D. Smith

UNITED STATES PATENT OFFICE.

RAYMOND D. SMITH, OF ARLINGTON, MASSACHUSETTS, ASSIGNOR TO TREMONT PRODUCTS COMPANY, OF BOSTON, MASSACHUSETTS.

HUMIDIFIER.

1,305,943.  Specification of Letters Patent.  Patented June 3, 1919.

Application filed July 24, 1918. Serial No. 246,622.

*To all whom it may concern:*

Be it known that I, RAYMOND D. SMITH, a citizen of the United States, residing at Arlington, in the county of Middlesex and Commonwealth of Massachusetts, have invented certain new and useful Improvements in Humidifiers, of which the following is a specification.

My invention relates, in general, to an improved apparatus for conducting a gas into a body of liquid and for then liberating or spraying the gas into the liquid below the surface level thereof, so that such gas when impelled by a suitable head of pressure may be caused to bubble upwardly through the liquid. My present improvement pertains, particularly, to a type of humidifying apparatus which may embody an operatively air-tight liquid container or tank having an air outlet connected above the designed level of the contained liquid, and provided with means in the form of a separate air duct or inlet arranged to permit air to be taken into said duct at a point above said liquid level,—said duct then terminating at an orifice below said level;—whereby, upon application of a suction force to said outlet, or of a pressure force to said inlet, air is indrawn through said duct, is released under the surface of, and rises through, the liquid, and is taken out and discharged through said outlet in a humidified condition and for any desired use. In certain types of such apparatus, the submerged orifice for releasing the air under water is preferably upwardly directed and is advantageously arranged as a rose or sprayer, in order more effectively to humidify the air by causing it to rise in many small bubbles through the water.

The principal object of my invention is to provide a simple and reliable apparatus whereby the depth below the surface of the water (or other liquid employed) of the point at which the air is delivered thereto may be automatically determined by float-actuated means; and specifically, in the particular type of apparatus described, whereby the air delivery orifice (preferably in the form of a rose or sprayer) may be maintained at substantially a uniform depth of submergence below the level of the liquid employed, so that the air passing through the apparatus is subjected to upward bubbling movement through a substantially constant depth of water, notwithstanding the use and consumption of the water, in the process of humidifying the air thus caused to bubble through it.

As a specific embodiment of the latter aspect of my invention I have illustrated in the drawings a liquid container which is designed merely to be filled by hand from time to time, and to an appropriate degree, with a suitable liquid, there being no automatic liquid replenishing means;—but my invention is not restricted to such form of apparatus.

This form, however, furnishes a simple and efficient humidifier for some purposes;—and is particularly suitable for introducing an admixture of humidified air into the fuel mixture or intake charge employed in explosive engines and particularly in automobiles.

The use of bubbling humidifiers by motorists as a preventive of carbon formation in the cylinders of the gasoline engine has demonstrated a marked variation in the rate of water consumption that is caused by the bubbling of air through respectively different depths of the water,—a condition which inheres in all humidifiers employing a hand filled tank for water and a stationary air sprayer near the bottom thereof. The operative effect of this condition is to cause a very rapid consumption of the water when the tank is nearly full which decreases to a very slow consumption when the air is bubbling through the shallow water of a nearly emptied tank. The practical undesirability of such characteristic of operation resides in the ununiformity of moisture thus delivered to the intake charge of the engine as the water level lowers in the tank and further resides in the more frequent filling of a tank of given content which is required by the excessively rapid use of water when the tank is more than half full.

It is of advantage, therefore, in such use, to obtain a uniform degree of saturation of the admixture of humidified air;—and that result, together with a consequent uniform rate of water consumption in the operation of the humidifier, is accomplished by my invention in such form and use.

My invention further comprises details of construction and arrangement having for their object the provision of an easily made humidifier that is simple and reliable in operation and that can be readily inspected, cleaned, and maintained in proper operating condition by the layman.

The principles of my invention in all the foregoing respects will be made clear by the following description and claims, in conjunction with the annexed drawings, in which latter:

Figure 1 is a plan view of a humidifier embodying one form of my improvements, a corner portion being broken away to show the construction of the circular window in section on the plane 1—1 in Fig. 2.

Fig. 2 is a front view of the humidifier.

Fig. 3 is a view looking at the right of Fig. 2 and is taken mostly in section on the vertical plane 3—3 in Fig. 1.

Fig. 4 is an enlarged detailed view, showing the sprayer and float of Figs. 1 to 3, inclusive, partially in central vertical section on the plane 4—4 in Fig. 2.

Fig. 5 is an enlarged fragmentary section taken on the plane 5—5 in Fig. 2, showing in detail the pivotal mounting for the sprayer-and-float-carrying tubular arm.

Fig. 6 shows a modified form of float, sprayer and tubular carrying arm, in which both the float and the sprayer are rigidly fixed to said arm.

Fig. 7 shows a still different arrangement of sprayer, float and arm.

Fig. 8 is a view looking at the left of Fig. 7.

In the drawings each reference numeral, when appearing in more than one of the several figures, designates different or corresponding views of the same element.

In Figs. 1, 2 and 3 the liquid container or tank 10 is shown as an integral and operatively air-tight box, having but three openings. The largest opening 15 of these, located in the front face of the box, is circular and provided with an exterior threaded flange 11 adapted to receive a ring-nut 12 by means of which a circular pane of glass 13 is retained against a filler gasket 14 of rubber or other soft material to form a water and air-tight closure for the opening 15.

Another opening 16 constitutes the air outlet from tank 10 and is threaded to receive a coupling elbow 17 through which a tube 18 may be connected for giving the tank 10 communication with a suitable suction means, such as the intake manifold of an automobile engine (not shown). By the intake manifold, I, of course, mean any point in the intake passage between the jet of the carbureter and the cylinders of the engine. Only in such passage does sufficient vacuum exist to draw an auxiliary stream of air through a device such as herein disclosed for humidifying the same and into joinder with gaseous fuel mixture passing to the cylinders.

The third opening 19 is merely a vertically drilled hole extending downwardly from the lowest point in a pouring cup formation or recess 21 in one upper corner of the tank 10 and opening into the counterbored portion 22 of a hole horizontally tapped through the tank,—the upright edge of the tank bulging from top to bottom at said corner so as to provide for a thickening of the wall to form the vertical boss 23, without materially reducing the cubical contents of the tank.

At the inner end of the counter-bore 22 the threaded opening through the boss 23 leads into the interior of the tank, said opening receiving a hollow bolt 24 that extends through the counter-bore 22 and has a head 26 of enlarged diameter under which a gasket 27 of rubber or other suitable material is clamped to seal the outer end of counter-bore 22 air-tight when said bolt is in place.

As clearly shown in Fig. 5 the interior 20 of bolt 24 is also threaded, preferably with the same number of threads per inch as has its exterior portion where mounted in the boss 23. Communication between the interior 20 of the bolt and counter-bore 22 is had through radially drilled holes 28.

The threaded interior of bolt 24 is adapted to receive the externally threaded end of a tube 29, which is bent to the form clearly shown in Figs. 1 and 3 so that its opposite, or free end 31 is disposed parallel to the threaded or mounted end. This free end of tube 29 has lengthwise thereof a series of gas discharging outlets 42 through its tubular wall, which outlets, partly because of the before mentioned disposition of free end 21, are all maintained at a common depth of submergence regardless of the angular inclination of the tube 29, itself, and are therefore, operative to evenly distribute the discharge gas. So far as I am aware this expedient for liberating a gas evenly at different points along the length of a submerged tubular conduit has never before been utilized in an apparatus employing a float-buoyed swingable conduit, while its advantages over the relatively complex and unevenly operating devices heretofore proposed for spraying gas into liquid will at once be apparent.

On the free end 31 of this swiveled tube is pivoted a circular and hollow bell-shaped part constituting the air sprayer of my device and which may have any construction suitable to the purpose thereof. The construction which I have chosen, to illustrate my invention, is shown in enlarged detail in Fig. 4. In the latter figure it is seen that the sprayer 32 comprises two light punched-metal parts,—an upper bell-shaped portion 33 and a flat disk 34 spun into the same to act as a closure for the bottom thereof. The bell-shaped portion 33 carries the float 36 which, as shown, is of cork and acts as a seal for the upper stem-like terminal 37 of the bell portion 33 and is effectively retained thereon by outwardly-struck spur-like projections 38. The entire sprayer and float structure is loosely retained on the free end 31 of the tubular arm (which passes diametrically through the bottom thereof) by a screw 39 which also serves to plug the end of the tubular arm. The bell formation 33 is perforated by a circular series of holes 41 out of which air is adapted to rise when supplied to the interior of the sprayer through ports 42 in the tube 31.

Having thus described the few and simple structural details of my improved humidifier, I will now, briefly, describe the operation of its parts.

Assuming for purpose of illustration, that the tank 10 is partially full of water and is bolted on the dash or other suitable portion of an automobile by means of mounting lugs 43, and that the tube 18 is suitably connected to the intake manifold of the automobile engine (not shown), it will be understood that when the engine is running suction will be applied to the opening 16. As the tank 10 is operatively closed from atmosphere, except through the duct 19, such suction will create a partial vacuum above the water in the tank and thus draw air downwardly through port 19 into the counter-bore 22, through the radially drilled holes 28 in bolt 24, and thus through the tube 29 and ports 42 in the free end 31 thereof to the interior of the sprayer 32. As the tendency of the air, of course, will be to rise, ports 41 in sprayer 32 obviously offer the path of least resistance for escape of the air, which, accordingly, is liberated through these ports and bubbles upwardly therefrom to the surface of the water. It will be understood that when air is being sucked through the apparatus in operation, the inlet 19 and swinging tube 29 are vacated of water as shown, the air thus traveling in contact with water only while rising from the sprayer outlets to the surface. When the device is idle, however, the water fills said passageways and seeks the same level in inlet 19 that it has within the container proper.

Upon reaching the space 44 above the water, the sprayer-liberated air has been humidified by its passage through the water and is taken from the tank through the outlet 16 to supplement the intake charge of the automobile engine. There may now be understood certain advantages peculiar to my invention that result from the particular coöperative relation of suction outlet 16, inlet 19 and pouring trough 21 at the top of the container. So far as I am aware no container for analogous purposes has heretofore been provided with a pouring trough provided by the contour of the container wall. In such containers as have been provided with funnel like devices to facilitate pouring in of liquid, the bottom of the pouring-trough formation has always been above or substantially on a level with the suction outlet comparable to 16. The pouring trough 21 herein described has its bottom substantially lower than said outlet whereby two useful purposes are served. First, during pouring in of the water or other liquid, indication will be had as to when the level of the water reaches the bottom of the pouring-trough 21 because at that time the water will be seen to rise through the opening 19 and into said trough; and second, with the water at such level (as shown in Fig. 1 of the drawing) there remains an air space of substantial height between the surface of the water and the outlet 16 so that actual water or spray due to bubble-caused effervescence at the surface will not be drawn out of the container through said outlet. On the other hand, by providing the trough 21 with inclosing walls that rise at lease to the height of outlet 16, I am enabled to perform the often desired operation known as "flushing" the engine, which consists in overfilling the container until the water level stands at the top of the pouring trough, at which time the surface of the water within the container is at or near the outlet 16 so that actual water or spray, rather than vapor, is drawn from the top of the container and injected into the engine intake.

The escape of the air into the water at other points than through the sprayer outlet ports 41 is effectively prevented by the simple expedient of the threaded swivel mounting of arm 29 and by an arrangement whereby the air, when delivered through ports 42 to the sprayer 32, has free exit from said rose through the ports 41 and will thus rise from said ports in preference to escaping at any openings that chance to be in the bottom portion of sprayer 32, where the latter is swiveled on the tubular arm 31.

The path of rising bubbles as indicated in Figs. 2 and 3 is influenced by the downwardly converging shape given to the float 36 so that such bubbles are in effect caused to spread farther apart as they rise; and are thus less likely to interjoin before reaching the surface of the water. This effect is of advantage in exposing a given amount of passing air to the greatest possible area of surface contact with the water for absorbing moisture therefrom. Of course the attainment of such advantages is not limited to the provision, nor to the inclusion of a float, for any downwardly converging element of suitable form and coöperative disposition relative to submerged gas sprayer ports could equally as well serve the purpose described.

Of course the float 36, though shown throughout the drawings as of cork, can as well be constructed as an inclosed air chamber or may be made of any suitable material of sufficient buoyant power. When cork is used it is well to shellac the water exposed surface of the float or to coat the same with paraffin to preclude soaking of water by the cork, as is well understood in the art.

As is obvious, a rubber or other flexing conduit may be employed to pass air to the submerged air sprayer. Such hose may be attached to a rigid pipe above or below the water level;—and in any such case I prefer to add vertically disposed guides to control the path of movement of the sprayer. So also, in employing swivel jointed pipes as shown, the swinging pipe carrying the sprayer could be connected by a joint above the liquid level. But the form illustrated is particularly advantageous as the rigid, swivel jointed pipe itself serves to guide the sprayer in its movements, and all swivel joints are below the liquid level and thus are, as before stated, water-sealed against air leakage in operation, and do not require nice and exact mechanical construction.

It should be noted that the self-comprised arrangement wherein the float pulls upwardly on the top of the sprayer 32 and the weight of arm 29 pulls downwardly on the bottom portion of said sprayer automatically creates a force tending strongly to aline the sprayer vertically and precludes its tipping about the swivel mounting on arm 31 so that the circular series of outlet ports 41 are maintained horizontal at all heights of the sprayer.

An important principle involved in this arrangement is that the center of gravity of the combined float and sprayer structure shall fall below the center of buoyancy of the float, and that preferably the point of swiveled connection between the sprayer 32 and arm 31 shall also fall lower than said center of buoyancy. Under these conditions the added weight of arm 31 upon the floating parts (which, as a force, cannot be depended upon to act directly through the axis of said swiveled connection) shall have the least possible tendency to tip the floating parts out of their designed vertical alinement and impair the even bubbling operation desired. To the furtherance of this aim it is also desirable that the axis of said swiveled connection shall intersect a vertical line passing through the center of buoyancy although it will be appreciated that even if this latter condition is not exactly attained, the effect of an off-center pull, due to offset weight of arm 31, will have relatively small effect to tip the floating parts when such weight acts below the center of bouyancy as compared to what would be the case if such weight were applied above the center of buoyancy. In other words, a floating structure having a relatively high center of gravity is much more subject to being overturned through the action of forces applied off-center than is a floating structure having a low center of gravity. Obviously, in the present instance, a tendency to overturn means a tendency of sprayer 32 to diverge from its designed horizontal disposition.

Because of the considerations above explained, I have arranged the float-buoyed parts of my improved humidifier so as to have a low center of gravity by which arrangement I am enabled to employ an extremely simple and compact float-buoyed sprayer structure embodying a single, concentrically disposed float which, through embodiment of the principles above pointed out, tends reliably and automatically to assume and maintain a properly alined position of the sprayer and thus to insure evenly distributed bubbling from all of the sprayer perforations.

So far as I am aware, the advantages to result from application of these principles have not before been perceived;—others who have made use of a swiveled, float-buoyed sprayer in analogous apparatus having considered it necessary to provide either an annular float of relatively large compass surrounding the sprayer, or else a plurality of widely spaced smaller floats bridged so as to buoy therebetween whatever forms of swiveled sprayer and connecting conduits are employed;—such conduits having heretofore been connected to rest their weight upon the sprayer at a point considerably above the center of buoyancy of the floats.

In Fig. 6 I have shown a form of my invention wherein both the float 36$^a$ and sprayer 32$^a$ are fixed rigidly on the tubular arm 29$^a$. In this connection it is to be noted that as air has a decided tendency to escape mostly from the highest outlets in a submerged chamber such as the sprayer 32$^a$, it is desirable, therefore, in this form of my invention to provide the sprayer with such convexity of curvature, and with holes or ports so constantly distributed over the surface of such curvature that whatever the angular position of tubular arm 29$^a$, a uniform number of outlet ports will be disposed in topmost position for liberating air from the sprayer into the liquid.

It will be seen, however, that in Fig. 6 the float 36$^a$, being offset as regards to vertical alinement with sprayer 32$^a$, cannot perform the function of a bubble-spreader as does the float 36 in Figs. 1 to 4, inclusive.

I may, however, with a sprayer so fixedly mounted, and so shaped for the purposes explained, provide a float, such as shown at 36$^b$, Fig. 7, attached to be swingable relative to the sprayer 32ᵇ while buoying the same. A simple means for such attachment is by swiveled connecting wires, such as 51, formed to straddle the sprayer 32ᵇ and secured to the float 36ᵇ by any suitable means, such as by prong terminals 52 and staples 53 hooked into the float. In this construction it will be obvious that regardless of the angular position of arm 29ᵇ, within its limits of operative movement, the float 36ᵇ will always aline vertically thereabove and thus serve as a bubble spreader for the liberated bodies of air. Obviously this broad idea of arranging a sprayer to be fixedly carried by the swinging arm and of pivotally connecting the float so as to ride above the same may be embodied in other and different forms. Also it will be understood that the sprayer need not necessarily and to be within the scope of my invention constitute a chamber of enlarged sectional capacity as related to the swinging tubular arm 29 and perforations such as 42 in the latter may be otherwise operatively disposed than as herein shown.

It being determined by practice that a loosely threaded joint, such as that between the threaded end of tube 29 and the bolt 24 effectively precludes escape of tube-conducted air through such joint, it will be readily perceived that, if desired, I may as well avail of a plurality of such joints in providing a conduit for supplying air to a float-buoyed sprayer, which conduit must be mobile to follow the movements of such sprayer, but must also be anchored at some point to a stationary mounting. Especially if this stationary mounting be disposed in submerged position at all periods of the operation, the threads at the swiveled connections may be cut to turn very loosely within each other for the water seal thus provided aids in preventing escape of the conducted air. It will thus be seen that the threaded swivel construction is particularly well adapted for the purpose to which it is herein put and is a very simple and inexpensive way of constructing a mobile conduit. It is not to be inferred, however, that my invention is restricted to the use of a rigid swiveled air conduit, for a fixedly attached hose of rubber, or other flexible material, can as readily be employed, if desired, as before stated.

It will be understood that I do not consider my invention to reside exclusively in the provision of a float-buoyed sprayer, as a float might be employed to actuate valve mechanism controlling outlet ports in a stationary portion of a submerged air conduit, said ports being located at respectively different heights in the tank 10, so that closure of certain of these ports and opening of others through means of the float-actuated valve mechanism would operate to liberate the air into the water at variable heights in tank 10 as determined by the water-level governed float.

In cases where it is desired to force the air or other gas through the liquid by pressure head over atmosphere in the inlet 19 rather than by suction applied to the outlet 16, the tank 10, of course, would not need to be an air-tight chamber and my invention will, therefore, be understood as not limited to the provision of such chamber.

Attention is particularly called to the small number of parts employed and to the free accessibility to the interior parts through the window opening 15 for the purposes of assemblage and disassemblage in cleaning or repairing the apparatus. Thus, if desired, the float and sprayer shown in Figs. 1 to 3, inclusive, may be removed from their tubular carrying arm by merely taking out the screw 39 and sliding the float and sprayer through this window opening.

It will be seen that in an apparatus, of the form herein illustrated and described, the condition in the liquid container, in operation, is that of partially exhausted atmosphere, or partial vacuum, above the body of contained liquid when connected to such container means. In the embodiment of my invention which I have elected to describe I maintain a substantially constant depth of submergence of the sprayer or air-delivery orifice by float means, which latter act to vary the vertical position of the sprayer, itself, in the container and without effecting any automatic control of the water-delivery into the container. I may, however, provide float-control means to govern a water valve delivery into said container, the latter being connected, through a suitable conduit, to an independent liquid container such as the water-cooling jacket of an internal combustion engine;—the suction or partial vacuum in the container sufficing to lift the liquid into the humidifying container, if the water feed supply is below the liquid level in the humidifier, and the valve permitting and shutting off, supply flow as desired, whether the independent feed supply be above or below the float-governed water level in the container. In such case I may employ either a stationary sprayer, or a float-controlled sprayer as desired;—and, in the latter case, I may employ a single float to control both the sprayer and the water supply valve, or separate floats, as may be most suitable to specific uses.

In the interest of obtaining the fullest possible uniform use of the water poured into the tank at a single filling thereof, all forms of my invention herein illustrated could advantageously be modified by providing the tank with an outlet choke-relief chamber above the top thereof and with a settling depression for the sprayer in its lowest position. That is to say, regarding the tank as of regular geometrical confines and having a given capacity, a certain portion of such capacity is necessarily wasted in the forms of my invention disclosed because, on the one hand, with a completely filled tank much spray or actual water may be drawn through the outlet 16 (instead of humidified air) and on the other hand, with a nearly emptied tank the height of water through which the air is caused to bubble decreases with further use of the water after the sprayer has come to rest by settling on the bottom of the tank.

Thus a choke-relief chamber, as mentioned above need be merely an enlargement of the compass of outlet 16 above the top of the tank so that when the tank is filled with water a sufficient air space still remains above such water in the vicinity of the outlet 16 so that water cannot be sucked upwardly therethrough. Such chamber, obviously, could be formed in the top of the tank itself or could comprise a separate and considerably enlarged conduit interposed between the tube connection and the top of the tank.

As regards a settling depression for the float-buoyed sprayer 32, it will be clear that such depression need comprise merely a sunken seat or recess in the bottom of tank 10 shaped and positioned to register with the bottom portion of sprayer 32 when the latter falls to its lowest position, this recess preferably being sufficiently deep to bring the outlet ports 41 substantially on a level with the main bottom of the tank. I have not deemed it necessary to illustrate such simple expedients as their provision is obvious from consideration of their purpose. I do not in this application claim either the apparatus or the method claimed in my copending applications, Serial Numbers, 295259, and 295260, filed May 7, 1919, which respectively cover the apparatus comprising an internal combustion engine having a carbureter and a suction intake manifold to which latter is admitted a supplemental supply of air moistened by being passed through water of constant depth, and the method involved in such apparatus.

Without, therefore, intending to limit my invention to the specific forms shown in the accompanying drawings or otherwise described or mentioned herein, what I claim as my invention is:—

1. In a bubbling apparatus including a container for a body of liquid; a conduit for leading air beneath the surface level of said liquid, and a submerged air-sprayer arranged to receive the air from said conduit and disposed to liberate said air into the liquid, the combination with said sprayer of a downwardly converging element positioned above the same for spreading the bubbles of air rising therefrom.

2. A bubbling apparatus embodying, in combination with a reservoir for a consumable liquid; a conduit extending into said liquid for leading air beneath the surface level thereof; a submerged air sprayer arranged to receive the air delivered through said conduit and disposed to liberate the same into said liquid; and a float connected to buoy said sprayer for maintaining it at a predetermined depth below the surface level of the liquid; said float being of downwardly converging shape and positioned above said sprayer for spreading the bubbles of air rising from said sprayer.

3. In a humidifier embodying a closed and operatively air-tight liquid container having an air outlet adapted for connection to a suction means and a separate air inlet opening to the atmosphere; a construction of said tank wherein the same is formed with a depression or hollow in an upper portion whereat said inlet opens to the atmosphere; said depression being of sufficient depth and inclosure extent to serve as a funnel to facilitate the pouring of liquid into said compartment through said air inlet.

4. A bubbling apparatus including in combination a container for liquid and a mobile conduit arranged in said container to lead a gas to varying heights therein, said apparatus including a float-buoyed sprayer swiveled to the free end of said mobile conduit whereby the sprayer outlets are maintained in substantially horizontal alinement throughout the operation of the apparatus so that bubbling occurs substantially uniformly from each of the sprayer outlets irrespective of the angular position of the said conduit, the said float being located wholly above the sprayer and positioned with respect thereto, so as to prevent commingling of the air bubbles after issuance from the sprayer.

5. A bubbling apparatus including in combination a container for liquid and a swinging conduit arranged in said container to lead a gas to varying heights therein and a sprayer chamber connected to said conduit and having an imperforate bottom and outlet ports in the sprayer chamber well above said imperforate bottom whereby liberated bubbles are prevented from commingling after issuance from the sprayer.

6. A bubbling apparatus including in combination a container for liquid and a mobile conduit arranged in said container to lead a gas to varying heights therein, a float operatively connected to and movable with and also relative to said conduit and a sprayer beneath the lowest part of and attached to said float and serving as a weight for the bottom thereof.

7. A bubbling apparatus including in combination a container for liquid and a mobile conduit arranged in said container to lead a gas to varying heights therein, an imperforate float operatively connected to and movable with and also relative to said conduit and a sprayer connected to said imperforate float, the float constituting a spacer interposed between said sprayer and the surface of the liquid thereby to determine the depth of submergence of the sprayer.

8. A bubbling apparatus including in combination a container for liquid, a conduit swingable in said container for leading a gas to variable heights therein; a float pivotally connected to said conduit to swing therewith and also relative thereto and a gas sprayer communicating with said conduit and suspended in submerged position below said float.

9. A bubbling apparatus including in combination a container for liquid and a swinging delivery conduit arranged in said container to lead a gas to varying heights therein and a combined float and sprayer structure swiveled to the free end of said conduit, the center of gravity of said float and sprayer structure being lower than the center of buoyancy.

10. A bubbling apparatus including in combination a container for liquid and a mobile conduit arranged in said container to lead a gas to varying heights therein, a sprayer operatively connected to said conduit and a float superposed above said sprayer and operatively connected thereto and constituting means to keep the rising bubbles separated.

11. A bubbling apparatus including in combination a container for liquid and a mobile conduit arranged in said container to lead a gas to varying heights therein, a sprayer structure having a swinging connection with the free end of said conduit and provided with sprayer openings above the bottom thereof and a float superposed upon said sprayer structure and constituting a spacer substantially to determine the depth of submergence of the sprayer structure.

12. A bubbling apparatus including in combination a container for liquid and a mobile conduit arranged in said container to lead a gas to varying heights therein, a sprayer structure having a swinging connection with the free end of said conduit and provided with sprayer openings above the bottom thereof and a float superposed upon said sprayer structure, said float acting to keep the rising bubbles from the sprayer structure separated and substantially preventing their commingling.

13. A bubbling apparatus including in combination a container for liquid, a swingable conduit arranged in said container to lead a gas to variable heights therein, an internally and externally threaded coupling for pivotally and removably anchoring one end of said conduit and a float buoyed gas sprayer carried at the free end to said conduit.

14. A bubbling apparatus including in combination a container for liquid and a swinging conduit arranged in said container to lead a gas to varying heights therein, a structure operatively connected thereto said sprayer having a swiveled connection to the free end of said swinging conduit, said swiveled connection being at a point below the center of buoyancy of said structure so that the weight of said swinging conduit helps to maintain the designed floating alinement of said structure.

15. In a vaporizing apparatus for supplementing the intake charge of an automobile engine, a closed liquid container having at its top a suction outlet adapted to receive piping connection from the engine, the top of the container adjacent said outlet being formed to constitute a hollow or pouring-trough having a bottom lower than said outlet and having an opening through said bottom into the container, whereby the level of the liquid in the container must rise above said opening to attain the height of said outlet.

16. In a vaporizing apparatus for supplementing the intake charge of an automobile engine, a liquid container having at its top a suction outlet adapted to receive piping connection from the engine, the top of the container adjacent said outlet being formed to constitute a hollow pouring-trough having a bottom lower than said outlet and having an opening therethrough into the container, the inclosing sides of said pouring-trough being substantially as high as said outlet whereby the level of the liquid in the container will attain substantially the height of said outlet upon rising to the top of said pouring-trough.

17. In a vaporizing apparatus, in combination, a liquid container adapted to be sealed air-tight by a removable closure and having at its top an inlet and a trough adapted to serve as funnel for pouring liquid therethrough; an elongated boss formed on an upright wall of the container to extend downwardly from the bottom of said trough, said boss containing a longitudinal passage leading downwardly from said inlet and also containing a transverse passage in communication with said longitudinal passage and opening to the interior of the container and instrumentalities for spraying into the liquid at variable heights in the container air that is admitted through said passages, including a swingable tubular arm carrying a submerged float-buoyed air-sprayer; together with coupling means adapted pivotally to anchor one end of said tubular arm at the end of said transverse passage opening into the container.

18. In a vaporizing apparatus for supplementing the intake charge of an automobile engine, a closed liquid container having at its top a suction outlet adapted to receive pipe connection from the engine, and a hollow or pouring trough coöperating with said container and having a bottom lower than said outlet and having an opening through said bottom and communicating with the container, whereby the level of the liquid in the container must rise above said opening to attain the height of said outlet.

19. In a vaporizing apparatus for supplementing the intake charge of an automobile engine, a liquid container having at its top a suction outlet adapted to receive piping connections from the engine, and a hollow pouring trough coöperating with said container and having a bottom lower than said outlet and having an opening therethrough and communicating with the container, the inclosing sides of said pouring trough being substantially as high as said outlet, whereby the level of the liquid in the container will attain substantially the height of said outlet upon rising to the top of said pouring trough.

20. In a bubbling vaporizer, in combination, a closed liquid container having in an upright wall thereof an opening giving access to the interior and adapted to be sealed in operation by a removable cover, a rigid gas delivery conduit pivotally mounted for swinging movement interiorly of said container and a buoyant structure insertable through said opening and adapted for removable assemblage with the gas discharging end of said conduit, said end of the conduit terminating substantially opposite said opening to facilitate said assemblage.

21. A bubbling vaporizer comprising in combination, a closed liquid container having in a wall thereof an opening and a removable plate for normally tightly closing said opening, a fixed air entrance duct extending from the exterior to the interior of said container and terminating in a position to be accessible through said opening; and a swinging air-spraying device arranged to be installable and removable through said opening and having connecting means adapted to permit its readily separable connection to the air duct terminus interior of said container.

Signed at Boston, Massachusetts, this 23d day of July, 1918.

RAYMOND D. SMITH.

Copies of this patent may be obtained for five cents each, by addressing the "Commissioner of Patents, Washington, D. C."

It is hereby certified that in Letters Patent No. 1,305,943, granted June 3, 1919, upon the application of Raymond D. Smith, of Arlington, Massachusetts, for an improvement in "Humidifiers," errors appear in the printed specification requiring correction as follows: Page 7, line 34, claim 10, for the word "float" read *floatable structure;* same page, line 74, claim 14, before the word "structure" insert the words *float-and-sprayer;* and that the said Letters Patent should be read with these corrections therein that the same may conform to the record of the case in the Patent Office.

Signed and sealed this 8th day of July, A. D., 1919.

[SEAL.]

R. F. WHITEHEAD,

*Acting Commissioner of Patents.*

Cl. 261—120.